United States Patent
Daly et al.

(10) Patent No.: US 11,135,919 B2
(45) Date of Patent: Oct. 5, 2021

(54) STEERING WHEEL INTERFACE MODULE WITH RETAINED PRESETS

(71) Applicant: Metra Electronics Corp., Holly Hill, FL (US)

(72) Inventors: Charles David Daly, Holly Hill, FL (US); William H. Jones, Jr., Holly Hill, FL (US)

(73) Assignee: Metra Electronics Corporation, Holly Hill, FL (US)

( * ) Notice: Subject to any disclaimer, the term of this patent is extended or adjusted under 35 U.S.C. 154(b) by 99 days.

(21) Appl. No.: 16/732,434

(22) Filed: Jan. 2, 2020

(65) Prior Publication Data

US 2020/0207206 A1 Jul. 2, 2020

Related U.S. Application Data

(60) Provisional application No. 62/787,428, filed on Jan. 2, 2019.

(51) Int. Cl.
| | |
|---|---|
| *B60K 35/00* | (2006.01) |
| *H04L 12/40* | (2006.01) |
| *H04L 29/08* | (2006.01) |
| *B60R 16/023* | (2006.01) |
| *B60R 11/00* | (2006.01) |

(52) U.S. Cl.
CPC .......... *B60K 35/00* (2013.01); *B60R 16/0238* (2013.01); *H04L 12/40* (2013.01); *H04L 67/12* (2013.01); *B60R 2011/001* (2013.01); *H04L 2012/40215* (2013.01)

(58) Field of Classification Search
CPC .............. B60K 35/00; B60K 2370/731; B60K 2370/828; B60K 2370/164; B60K 37/06; B60K 2370/782; H04L 12/40; H04L 67/12; H04L 2012/40215; B60R 16/0238; B60R 2011/001; B60R 16/023
See application file for complete search history.

(56) References Cited

U.S. PATENT DOCUMENTS

| | | | |
|---|---|---|---|
| 6,956,952 B1* | 10/2005 | Riggs .................... | H04B 1/082 307/10.1 |
| 10,464,500 B2* | 11/2019 | Wincek ............... | B60R 11/0211 |

* cited by examiner

*Primary Examiner* — Toan N Pham
(74) *Attorney, Agent, or Firm* — J. Wiley Horton

(57) ABSTRACT

A steering wheel control interface module that can automatically detect the type of vehicle it is installed in and automatically detect the type of aftermarket radio it is sending messages to. In addition, the interface module can retain certain user pre-selects and use those to properly set the state of an aftermarket radio.

20 Claims, 7 Drawing Sheets

STEERING WHEEL INTERFACE MODULE WITH RETAINED PRESETS

CROSS-REFERENCES TO RELATED APPLICATIONS

This non-provisional patent application claims priority to U.S. Provisional Patent Application No. 62/787,428. The provisional application listed the same inventors. It was filed on Jan. 2, 2019.

STATEMENT REGARDING FEDERALLY SPONSORED RESEARCH OR DEVELOPMENT

Not applicable

MICROFICHE APPENDIX

Not applicable

BACKGROUND OF THE INVENTION

1. Field of the Invention

This invention relates to the field of motor vehicle control systems. More specifically, the invention relates to a steering wheel control interface that can detect particular vehicle and aftermarket component configurations and properly transmit steering wheel control signals to the aftermarket component, along with desired user default settings.

2. Description of the Related Art

This disclosure builds upon the disclosure of commonly-owned U.S. Pat. No. 8,214,105. Vehicle owners often seek to replace factory-installed audio and video components with aftermarket components. These aftermarket components often must be hard-wired to a vehicle's factory wiring. This may require that a user connect various power, audio, and video wires, and further that the aftermarket component communicate and operate, in part, through such wiring. Many modern vehicles include controls on their steering wheels for operating factory-installed components. These steering wheel controls (SWC) may, for example, increase the volume of a radio, increase the track of a CD being played, or change from one audio source to another. However, the particular configuration of a vehicle's steering wheel controls differs significantly among vehicle makes, models, and model years. Accordingly, it is very difficult for manufacturers of aftermarket components to provide compatibility between their components and the wide array of steering wheel control configurations.

U.S. Pat. Nos. 7,020,289 and 6,956,952 describe interfaces for handling SWC signals. A commercial product similar to such interfaces is a SWI-JACK interface manufactured by the Pacific Accessory Corporation (PAC). The SWI-JACK interface has a wire harness on an input side and an output plug on an output side. To install the input side, an installer first selects a particular wire from among many included on the wire harness. The selection is made based upon a lengthy chart, which indicates suitable wires for particular vehicle makes and models. Once selected, the installer electrically connects the selected wire to a steering wheel audio control wire, which provides an output signal from the steering wheel audio controls. The SWI-JACK interface is geared to audio control wires provided within the steering column or underneath the vehicle's dashboard. To install the output side, the installer couples the output plug to a wired remote-control input on an aftermarket head-unit. Once the input and output sides have been installed, the installer completes installation by adjusting an input switch on the SWI-JACK. The adjustment is made according to the manufacturer of the aftermarket head unit.

There are several drawbacks to an interface such as the SWI-JACK. First, the interface is not designed to function upon installation. Rather, the installer must perform a lengthy programming process, with pressing and releasing the respective buttons on the steering wheel controls according to an installation sequence. The process is not only lengthy, but unforgiving. If the installer does not correctly perform the sequence, he must start the sequence over. Second, there can be several wires provided within a vehicle's steering column or dashboard. As a result, the installer may choose the wrong wire when attempting to electrically connect the interface to the steering wheel audio control wire. This could permanently damage components within the vehicle and compromise vehicle safety. A related drawback results from requiring the installer to choose a particular wire from the many wires of the wiring harness: if the installer selects the wrong wire from the harness, damage or malfunction to either the SWI-JACK or the vehicle can result. Furthermore, an inherent drawback of passive component interfaces, such as the SWI-JACK, is that they are compatible only with a limited number of manufacturers of aftermarket radios.

Another type of interface incorporates wireless transmission to relay SWC signals to the aftermarket component. Products manufactured with this design include the SWI-X interface by PAC and the REMOTE series interface by SoundGate. Generally speaking, these interfaces have a wire harness and an infrared (IR) receiver on an input side, and an IR transmitter on an output side. Installation of the input side proceeds in a manner similar to that described above in connection with the SWI-JACK. Installation of the output side involves mounting and aiming the IR transmitter such that it can communicate with an IR receiver integrated with the aftermarket component.

This design has several limitations, one of which is the lengthy programming process. The input and output sides having been installed, the installer must perform a wireless remote control "learning" process. For each steering wheel audio control button, the installer must use the remote control provided with the aftermarket component to emit an IR signal to the interface's IR receiver. The interface then "learns" the IR signal and stores its signal format for future reproduction, similar to a process used in learning television remote controls. The interface cannot reproduce an IR signal according to the steering wheel audio control inputs until this learning process has been performed.

The wireless interface design also fails to overcome the drawbacks of the SWI-JACK interface. The installer must connect the appropriate steering wheel audio control wire, risking permanent damage and malfunction to the vehicle and the interface. And if the installer incorrectly performs any part of the programming process, he must start over, leading to frustration.

Some methods of communication between a vehicle's electrical components are known.

U.S. Pat. Nos. 7,275,027, 6,114,970, 6,823,457, 6,141,710, and 6,396,164 describe interconnections between a factory-configured vehicle bus (OEM bus) and a device bus for aftermarket products and accessories. These interconnections generally use a gateway controller. However, in these devices, the vehicle and device bus structures are pre-determined. In this configuration, the gateway controller merely translates between a single set of OEM bus commands and a single set of device bus commands. Thus, these gateway controllers are tied to a specific vehicle bus and/or device bus architecture. Accordingly, they are inapplicable to universal aftermarket products.

Another disadvantage of aftermarket stereo systems as opposed to OEM systems is the limited ability to retain user "pre-selects." OEM systems can retain a particular pre-select, such as a desired volume setting. Such systems may even identify a particular user (such as by determining which physical or electronic key is employed for the vehicle) and enter that pre-select the next time the user drives the car. Aftermarket stereos do not retain this functionality. As an example, the volume level is often simply the last level selected.

As the above discussion makes clear, there is a need to provide a simple, universal solution for providing SWC inputs of all makes and models to aftermarket radios from a wide variety of manufacturers. In particular, an installer can benefit from a device which automatically detects at its input an SWC signal and which configures itself accordingly. Additionally, installers can further benefit from a device which automatically detects an aftermarket component and which further configures itself accordingly. In this manner, the device allows for a simple "plug-and-play" installation process, reducing the stress and risks of installation for both professional and self-installers.

BRIEF SUMMARY OF THE PRESENT INVENTION

The present invention comprises a steering wheel control interface module that can automatically detect the type of vehicle it is installed in and automatically detect the type of aftermarket radio it is sending messages to. In addition, the interface module can retain certain user pre-selects and use those to properly set the state of an aftermarket radio.

DETAILED DESCRIPTION OF THE INVENTION

Figure 1:
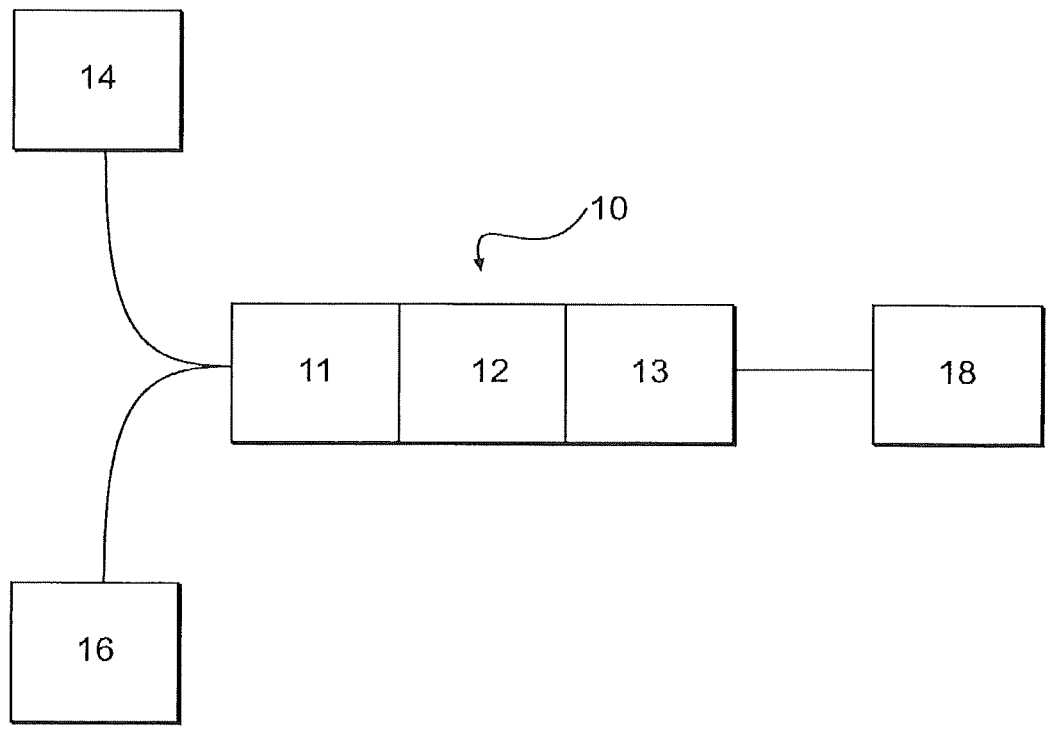
FIG. 1 shows a top-level block diagram of a device suitable for use in various embodiments of the invention.

As described above, various aspects of the invention provide for SWC interfaces that can automatically detect factory-installed and aftermarket components and buses.

Vehicles may transmit signals from a steering wheel to various factory-installed components in various ways. The method of transmission can vary among vehicle makes and models. One common method is a variable resistance method. In this method, the steering wheel component can be, for example, a button provided with an arrangement of switches and resistors. Operation of the button by pressing closes or opens a switch. In turn, this operation changes the resistance on an output line. The output line is wired to a factory-installed component, such as an OEM radio. The variable resistance is fed into the component, which decodes the resistance and translates the change in resistance into the operation of the steering wheel button.

Another common method is to use a data bus. This method, which is common in many modern vehicles, incorporates a data bus architecture to send signals and commands among the various electrical components of a vehicle. Known architectures include J1850, CAN-BUS, and K-BUS. In this method, circuitry is coupled to a steering wheel button. This circuitry transmits digital signal commands along the data bus when the button is pressed. The OEM radio monitors the data base for the commands. Operation of the radio is controlled according to commands received by the radio over the bus.

As noted above, the transmission of SWC signals from steering wheel components can vary from vehicle to vehicle. An auto-detection method suitable for an individual vehicle thus can depend, broadly speaking, on the method of transmission used in that vehicle, and, more specifically, on the particular electronic configuration of its steering wheel components. Accordingly, one aspect of the invention provides methods for auto-detecting SWC signals among many makes and models of vehicles. These methods will now be described.

In a vehicle where SWC signals are transmitted by a variable resistance method, the SWC signals can be auto-detected by measuring characteristic voltages or other electronic properties associated with that vehicle's SWC components. In many vehicles configured according to a variable resistance method, SWC signals are transmitted on channels configured with a standby resistance. That is, even when no SWC signal is being transmitted on a channel as may be the case when, for example, the "volume up" steering wheel button is not depressed a small electrical current nonetheless is drawn by the standby resistance. In these instances, an SWC interface can be configured to measure, for example, a characteristic voltage exhibited by the channel. This voltage can be measured by the SWC interface using, for example, a resistor pulled up to a suitable voltage, such as 5 V or 12 V, depending on the particular SWC configuration of the vehicle, or a resistor pulled down to ground. To measure the characteristic voltage, a resistor pulled up to a suitable voltage may be used when a vehicle's standby resistance is pulled down to ground, while a resistor pulled down to ground may be used when a vehicle's standby resistance is pulled up to a particular voltage.

The following examples illustrate the principle of a characteristic voltage. Consider two hypothetical vehicles, A and B, each having an SWC channel that transmits a "volume up" signal. In vehicle A, the channel operates between 0 V and 5 V and has a standby resistance of 6 kΩ that pulls down to ground. In vehicle B, the channel operates between 0 V and 5 V and has a standby resistance of 24 kΩ that pulls down to ground. If an SWC interface with a pull-up resistance of 1 kΩ is connected to the channel of vehicle A, the voltage in front of the pull-up resistance will be 4.29 V. Thus, 4.29 V is a characteristic voltage of the volume up channel of vehicle A. On the other hand, if an SWC interface with a pull-up resistance of 1 kΩ is connected to the channel of vehicle B, the voltage in front the pull-up resistance will be 4.80 V. Thus, 4.80 V is a characteristic voltage of the volume up channel of vehicle B.

In some embodiments of the invention, the SWC signals of a particular vehicle can be auto-detected based on the characteristic voltage of individual SWC channels. In this aspect of the invention, an SWC interface can be electrically connected to the channels of a vehicle's steering wheel components. Because each SWC channel of a particular vehicle may a characteristic voltage, patterns among the characteristic voltages of the channels can be used by the SWC interface. For example, a particular vehicle manufacturer may configure its vehicles such that each SWC channel has a characteristic voltage of 4.29 V when measured by a pull-up resistance of 1 kΩ. Another manufacturer may configure its vehicles such that each SWC channel has a characteristic voltage 4.80 V when measured by a pull-up resistance of 1 kΩ. Yet another manufacturer may configure its vehicles such that each SWC channel has a characteristic voltage of 1.20 V when measured by a pull-down resistance of 4.7 kΩ. Those having skill in the art will recognize that there are many patterns possible, and that such patterns may vary depending on, for example, a vehicle's make, model, and year. A configuration of an SWC interface suitable for auto-detecting SWC signals transmitted over a variable resistance network is discussed below in connection with FIGS. 2A and 2B.

Although some embodiments directed to auto-detecting a vehicle's variable resistance network may utilize electrical currents drawn by a standby resistance, the invention does not require a standby resistance to be operable. For example, the SWC channels in some vehicles do not have a detectable standby resistance. In this instance, auto-detection may proceed in conjunction with an instruction to an installer to operate one or more SWC components, e.g., the installer may be instructed to press and hold an SWC volume up button for the duration of the detection phase.

Turning now to vehicles where SWC signals are transmitted by a data bus method, SWC signals can be auto-detected by determining a particular vehicle's bus type from among known communication protocols. In vehicles configured with a data bus, data bits are transmitted on the bus at a predetermined frame rate. The frame rate of a particular bus can depend on the communication protocol used by the bus. Thus, different busses may transmit data bits at different frame rates. For example, General Motors' GMLAN bus transmits frames at 33.33 kb/s, while Chrysler's CAN bus transmits frames at 83.33 kb/s. Thus, by determining the transmission rate of a vehicle's bus, the SWC interface also can determine the type of data bus used in the vehicle. Because data bus types among vehicle manufacturers are often highly proprietary, a determination of bus type can be sufficient to allow a designer of an SWC interface to configure the interface to differentiate among signals transmitted on the data bus and to decode individual SWC signals.

It is also possible to determine the vehicle type using a trial-and-error application of a series of known CAN bus communication protocols. There are a limited number of CAN bus communication protocols and these can be stored in memory. The processor in the interface module can simply apply each in sequence until validly decoded CAN bus messages result. Once valid messages are seen the correct CAN bus protocol has been identified and this can then be used going forward.

In some embodiments of the invention, SWC signals of a particular vehicle can be auto-detected based on a determination of a communication protocol of the vehicle data bus. In these embodiments, an SWC interface can be electrically connected to the data bus by, for example, a jack, a plug, or manual connection of electrical wires. In some vehicles, connecting an SWC interface and providing electrical power to the vehicle can be sufficient to allow the SWC interface to auto-detect SWC signals. This is because some vehicles transmit SWC data frames even when no steering wheel component is being operated, e.g., when no button is depressed. Thus, there are embodiments in which an SWC interface can determine the frame rate of the vehicle's data bus without any manual operation of a steering wheel component. In other vehicles, however, a steering wheel component may need to be operated in order to have data frames transmitted on the bus and to allow for a determination of the frame rate. Auto-detection of SWC signals in these vehicles may require manual operation of one or more steering wheel components. For example, an installer may need to press a steering wheel button at one-second intervals during an auto-detection process performed by the SWC interface. A configuration of an example SWC interface suitable for auto-detecting SWC signals transmitted on a vehicle bus is discussed below in connection with FIG. 2C.

There are some embodiments of the invention in which an SWC interface is electrically connected to variable resistance network, and there are other embodiments in which an SWC interface is electrically connected to a vehicle data bus. However, the invention is not limited to one electrical connection or the other; in some embodiments an SWC interface can connect both to a vehicle's variable resistance network and to the vehicle's data bus. In these embodiments, an auto-detection process can proceed according to information gained from both connections, as will be recognized by those having skill in the art. For example, although a connection to a variable resistance network may yield characteristic voltages of that network, this information may not be sufficient to auto-detect the vehicle's SWC signals. That is, any pattern identified in the characteristic voltages may not be sufficiently unique to configure an SWC interface. However, a connection to the vehicle bus can allow an SWC interface to determine other information besides a data frame rate, such as the vehicle's unique vehicle identification number (YIN). This information obtained from the data bus, together with the pattern of characteristic voltages, may be sufficient to allow the SWC interface to auto-detect SWC signals. Thus, the auto-detection process can be performed using both connections, where one connection or the other may not have been sufficient.

FIG. 1 shows a top-level block diagram of an SWC interface according to an embodiment of the invention. SWC interface 10 includes an input side 11 and an output side 13. Input side 11 can include one or more components configured to auto-detect SWC signals that are transmitted from a steering wheel component 14 or on a vehicle bus 16. Specific features of input side 11 are discussed below in connection with FIGS. 2A-C. Output side 13 includes one or more components configured to auto-detect aftermarket component 18 and further configured to deliver SWC signals to aftermarket component 18. Specific features of output side 13 are discussed below in connection with FIG. 3. SWC interface 10 further can include signal processing components 12, which can process SWC signals received at input side 11 prior to outputting the signals at output side 13. In various embodiments of the invention, processing of SWC signals by signal processing components 12 can depend upon auto-detections performed at input side 11 and output side 13.

The manner in which SWC signals are auto-detected can depend on the configuration of interface 10. For example, if interface 10 is configured to auto-detect signals transmitted from a steering wheel component as may be the case when a vehicle transmits SWC signals using a variable resistance method input side 11 can include a wiring harness (not shown), through which interface 10 can be hard-wired to steering wheel component 14. As another example, if interface 10 is configured to auto-detect signals transmitted on a vehicle bus as may be the case when a vehicle transmits SWC signals on a bus input side 11 can include a plug which connects to a jack associated with vehicle bus 16.

Figure 2A:
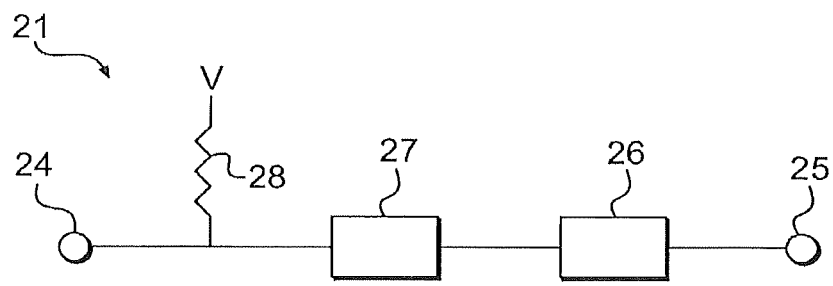
FIG. 2A shows a top-level block diagram of an example circuit according to one aspect of the invention.
Figure 2B:
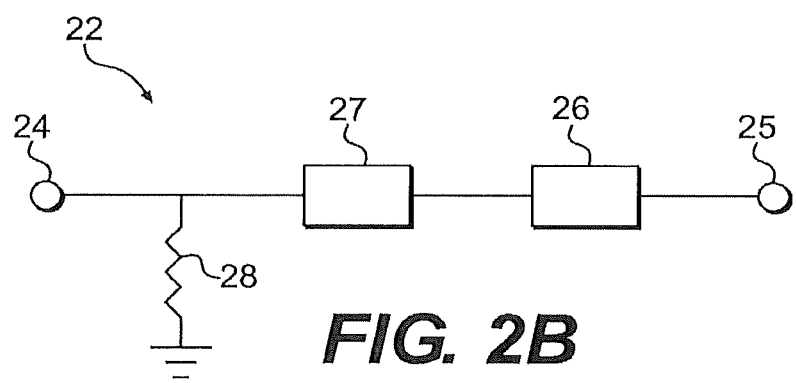
FIG. 2B shows a top-level block diagram of another example circuit according to the same aspect of the invention as illustrated in FIG. 2A.
Figure 2C:
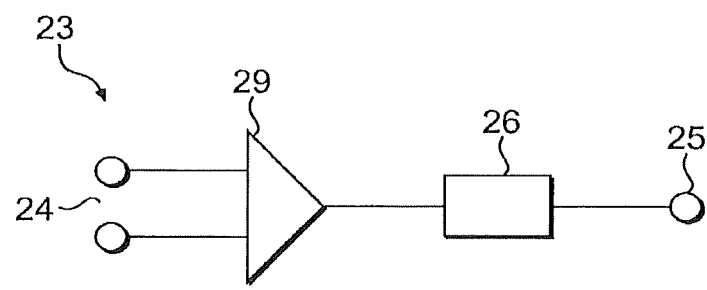
FIG. 2C shows a top-level block diagram of an example circuit according to another aspect of the invention.

FIGS. 2A-C show top-level block diagrams of example circuits capable of auto-detecting SWC signals. In some embodiments of the invention, these circuits may be used individually, while in other embodiments they may be used in combination. As noted above, these circuits can comprise an auto-detecting input side of the SWC interface shown in FIG. 1.

FIGS. 2A and 2B each illustrate a circuit suitable for auto-detecting SWC signals in a vehicle that transmits SWC signals using a variable resistance method. Circuit 21 is one that determines a characteristic voltage of an SWC channel through the use of a pull-up resistor. This circuit can be suitable for use where the standby resistance of a channel pulls the channel to ground. Circuit 21 includes input port 24, output port 25, processor 26, analog-to-digital (A/D) converter 27, and resistance 28. Input port 24 provides an electrical connection to one or more SWC channels. Within the circuit, input port connects to resistance 28. Resistance 28 can be comprised of a single resistor, a variable resistor, or any suitable circuit element that allows for a voltage on the SWC channel to be measured. Resistance 28 pulls the output of the channel up to a voltage V, which can be determined according to design considerations and which may be variable. By virtue of resistance 28, the voltage at the input port 24 is a characteristic voltage of the SWC channel. This voltage is passed through A/D converter 27 and read by processor 26. As previously discussed, because the wiring schematics of steering wheel components can vary among makes and models, different vehicles can have different correlations of their characteristic voltages. Thus, processor 26 can include a recognition module, which can determine the particular configuration of the vehicle from among known configurations. These known configurations, which can be preprogrammed into the recognition module, allow the processor to recognize the resistance network of the steering wheel control circuit particular to the vehicle. In this manner, the variable resistances can be auto-detected and decoded for further processing and transmission an SWC interface. The output of processor 26, which can include characteristic voltage readings, resistance determinations, and information relating to a recognized resistance network, is passed to output port 25, which can be connected to other elements of an SWC interface.

Circuit 22 is similar to circuit 21 except that circuit 22 can be suitable for use where the standby resistance of an SWC channel pulls the channel up to a particular voltage, e.g., 5 V or 12 V. Circuit 22 can be comprised of the same elements as circuit 21 but in a slightly different configuration: circuit 22 differs from circuit 21 in that resistance 28 pulls the output of the channel down to ground. As in circuit 21, the resistance 28 causes the voltage at the input port 25 to be a characteristic voltage of the SWC channel. The other elements of circuit 22 can perform functions similar to those of circuit 21.

With regard to the circuits illustrated in FIGS. 2A and 2B, those having ordinary skill in the art will recognize that many other circuit designs may be suitable for detecting a characteristic voltage of an SWC channel. Although these figures illustrate circuits having both analog and digital elements, suitable circuits may be wholly digital or analog, and may incorporate other elements not discussed herein. Moreover, when comprising an input side of an SWC interface, there may be many such circuits employed. For example, if a vehicle transmits SWC signals over multiple channels, there may be that same number of individual circuits included in the SWC interface, with one circuit corresponding to each channel. Alternatively, there may be only one circuit used, with the circuit configured to measure a characteristic voltage of each channel. The invention is sufficiently flexible that those having skill in the art will be able to adapt it to any particular designs or applications.

FIG. 2C illustrates a bus-monitoring circuit 23, which can be suitable for auto-detecting SWC signals in a vehicle that transmits SWC signals on a bus. Circuit 23 includes input port 24, output port 25, processor 26, and line receiver 29. Input port 24 provides an electrical connection to the vehicle bus. Within the circuit, input port 24 connects to line receiver 29, which converts vehicle bus signals into logic level signals that are suitable for analysis by processor 26. Output from line receiver 29 is passed is processor 26. Processor 26 of circuit 23 can be configured to perform determinations different from the processors in circuits 21 and 22. Specifically, based upon the output from line receiver 29, processor 26 can auto-detect the bus data rate and the vehicle bus type. Processor 26 further can include hardware, software, or a combination thereof to detect commands present on the bus and decode those commands that relate to SWC signals. In this manner, SWC signals transmitted on the data bus can be auto-detected and decoded by the bus-monitoring circuit 23. The output of processor 26, which can include data relating to any of the information detected, decoded, or determined by it, is passed to output port 25, which can be connected to other elements of an SWC interface.

Line receiver 29 may be configured in various ways depending on the configuration of the vehicle bus. For example, data on a vehicle bus may transmitted by single-ended signals or by differential signals. Accordingly, line receiver 29 may be capable of receiving one or more types of signals. As another example, electrical signals on the vehicle bus may vary in amplitude; signal swing on one vehicle bus may be 100 mV, while on another vehicle bus signal swing may be 12 V. Line receiver 29 thus can be capable of converting various signal amplitudes to signals compatible with logic levels of processor 26. For example, line receiver 29 may output to processor 26 a 0 V to 5 V electrical signal.

One aspect of the invention is that an input side of an SWC interface can connect to vehicle components that transmit SWC signals. Embodiments of the invention according to this aspect have been described above. Another aspect of the invention is that an output side of an SWC interface can connect to an aftermarket component and auto-detect that component. In still another aspect of the invention, an SWC interface can deliver SWC signals to an aftermarket component. Embodiments according to these aspects will now be described.

Referring back to FIG. 1, the output side 13 of SWC interface 10 can be coupled to aftermarket component 18 via, for example, a wired connection. Most aftermarket components include a wired remote control input port at the rear of the component. That input port can accept command inputs from a wired remote control that is either bundled with the component or sold as an accessory. However, each manufacturer of aftermarket component uses different techniques to convey remote control signals. Thus, prior to SWC interface 10 providing SWC signals to aftermarket component 18, it may be necessary to determine the manufacturer or model of component 18 in order to provide SWC signals in a format recognizable by component 18.

Some aftermarket components utilize a variable resistance method that is similar to the variable resistance method for conveying SWC signals from a steering wheel component. In this method, a remote control that is electrically coupled to the input port contains a baseline resistance or voltage detectable even when the remote control is not being operated, e.g., when none of its buttons is depressed. Each button on the remote control corresponds to a unique change in resistance or voltage in the wired connection from the remote control to the aftermarket component input port.

Other aftermarket components utilize a digital waveform method that is similar to the use of light-emission waveforms for transmitting IR signals from a wireless remote control, except that the waveforms are transmitted over a wired connection. Each button on the remote control is associated with a unique modulation sequence. When a button is depressed, a pulsed electrical signal generated according to the associated sequence is transmitted from the remote control to the aftermarket component input port.

Output side 13 can perform an auto-detection of aftermarket component 18 by analyzing the electrical characteristics of its input port. In typical aftermarket components, the input port is pulled up to a particular internal supply voltage Vcc by a particular resistance. As with the variable resistance methods for factory steering wheel components, however, there are other input port configurations. For example, some manufacturers may design their components such that their remote control input ports are pulled down to ground. The invention is sufficiently flexible that output side 13 can accommodate for variations in input port electrical characteristics.

One method for analyzing the electrical characteristics of an aftermarket component is to measure the open circuit voltage and the load voltage of the input port. Output side 13 can be configured to make these measurements. When measuring the load voltage, output side can be configured to draw a known current, such as 100 μA. Based upon the two voltages and the known current drawn, the pull-up or pull-down resistance of the input port can be determined. Using these electrical values, output side 13 (or a component to which it can communicate, such as signal processing components 12) can access a predetermined lookup table which correlates the electrical characteristics of component 18 to a particular manufacturer and/or model. In this manner, output side 13 can determine the particular manufacturer and/or model of the aftermarket component 18, and SWC interface 10 can associate itself with a set of electrical output signals that are correlated to respective remote control commands recognized by component 18. Accordingly, when the output side 13 receives a control command from input side 11 or signal processing components 12 indicating input from steering wheel component 14 or vehicle bus 16, the output side 13 can transmit an appropriate electrical signal to aftermarket component 18.

Figure 3:
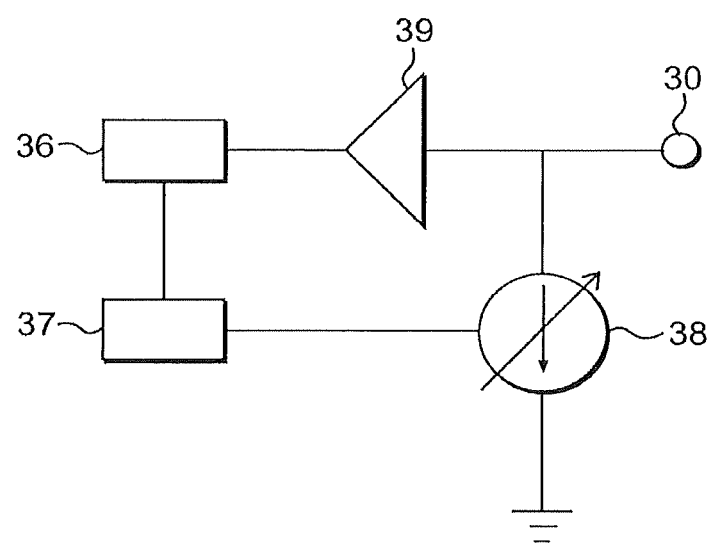
FIG. 3 shows a top-level block diagram of an example circuit according to still another aspect of the invention.

FIG. 3 shows a top-level block diagram of an example circuit capable of analyzing the input port of an aftermarket component. This circuit can comprise an auto-detecting output side of the SWC interface of FIG. 1. The circuit includes port 30, A/D converter 36, processor 37, current source 38, and buffer 39. Port 30 can be electrically coupled to the input port of the aftermarket component. Current source 38 can be varied by processor 37 depending on whether a measurement of the open circuit voltage or the load voltage is desired. Processor 37 further can vary resistance 38 to control the current drawn through port 30. Analog voltages from the input port pass through buffer 39 and A/D converter 36 prior to reading by processor 37. Processor 37 can read and calculate the electrical characteristics of the input port. These characteristics can be sent to other components of an SWC interface, such as signal processing components 12.

In various embodiments of the invention, an output side of an SWC interface can transmit SWC signals to an aftermarket component following auto-detection of the component. Although transmission of SWC signals can proceed according to any suitable method, in one embodiment of the invention, an output side of an SWC interface is configured to transmit both variable resistance signals and digital waveform signals, depending on the auto-detection of an aftermarket component. Referring to the SWC interface of FIG. 1, in this embodiment output side 13 can include a variable resistance circuit and a digital waveform emission circuit.

A variable resistance circuit can include a regulated current sink that is driven by a pulse width modulated (PWM) output, an output operational amplifier, and a bipolar junction transistor. The PWM output is coupled to an input of the amplifier, and the output of the amplifier is coupled to the base of the bipolar junction transistor. By increasing or decreasing the duty cycle of the PWM, the DC voltage at the input of the amplifier is increased or decreased, respectively. Consequently, the amplifier output voltage (and base of the bipolar junction transistor) increases or decreases, which increases or decreases a current at the collector of the bipolar junction transistor. This current is drawn at the aftermarket component wired input port by, for example, a pull-down resistor. An increasing current through the pull-down resistor may be interpreted by the aftermarket component as a remote control command according to its predetermined configuration. While other methods of reproducing a variable resistance are possible, and may be interchangeable with the method of the circuit just described, the use of a variable PWM signal can allow for flexibility in variable resistance values.

For transmission of digital waveforms, a digital waveform emission circuit can generate a modulated signal pattern replicating a known pattern corresponding to a particular remote control command for the particular manufacturer of the aftermarket component. The circuit then can transmit the signal pattern via the wired link to the aftermarket component using any one of a variety of known modulated signal transmission techniques.

Figure 4:
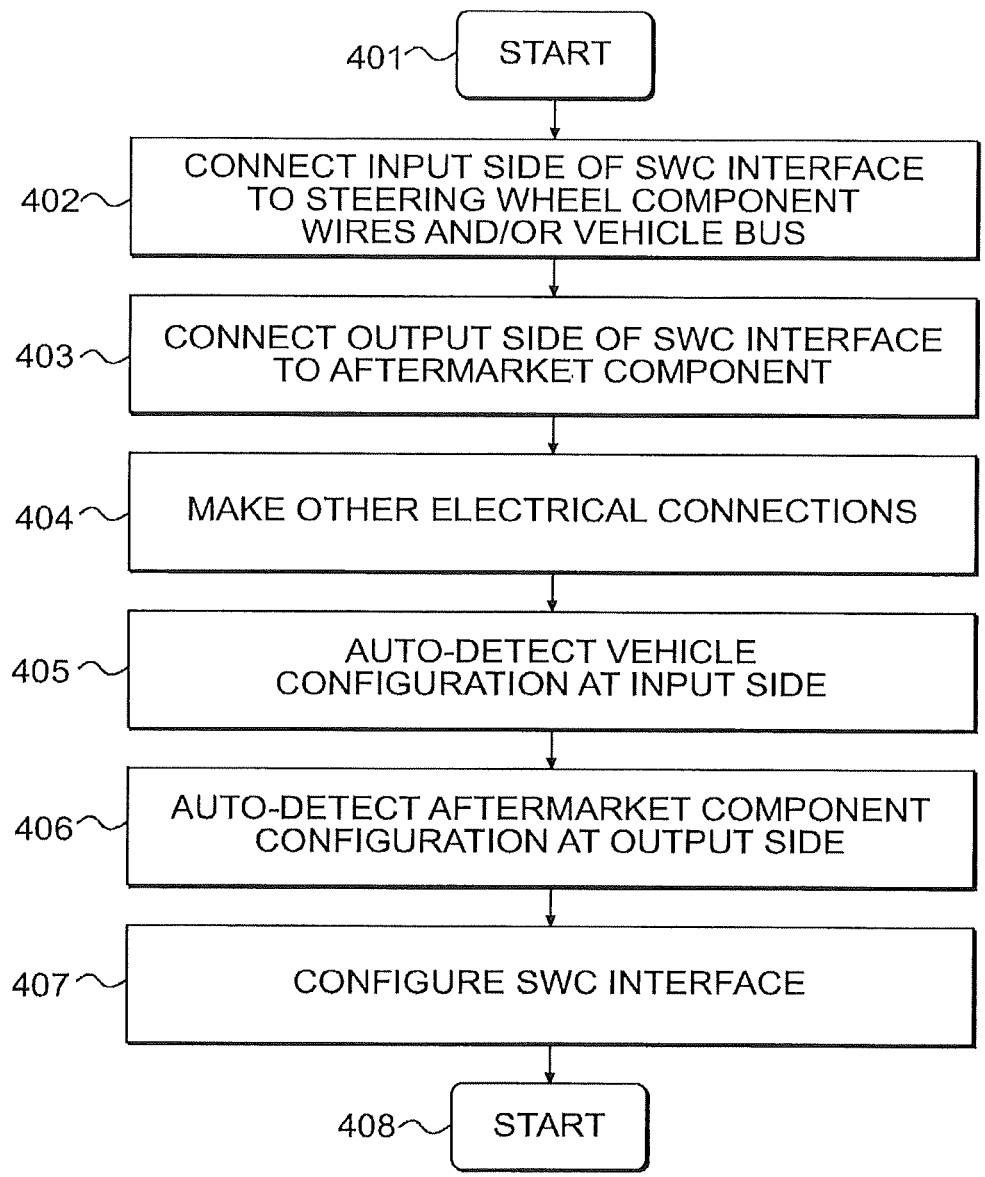
FIG. 4 illustrates a method of installing and configuring a device according to various embodiments of the invention.

FIG. 4 illustrates an example method of installing and configuring a device such as the SWC interface of FIG. 1. The method begins at step 401. Prior to this step, an aftermarket component, which may be replacing a factory-installed component, has been installed in a vehicle, and any typical connections, such as power, video, or audio connections, may have been made. At step 402, an input side of the SWC interface is electrically connected to the vehicle. Depending on the particular vehicle in which the SWC interface is being installed, this step may include connecting the SWC interface to one or more steering wheel component wires and connecting the interface to the vehicle's data bus. Step 402 may require splicing or cutting factory-installed wires and may involve proprietary electrical connectors. At step 403, an output side of the SWC interface is electrically connected to the aftermarket component. In some instances, the connection may be made simply by plugging into a jack provided in the aftermarket component. However, in other instances step 403 may require wiring similar to step 402. At step 404, other electrical connections are made. These connections may be required for the SWC operate or function properly and may include, for example, connecting a power wire to the SWC interface, connecting an accessory power wire from the aftermarket component to the SWC interface, or connecting a ground wire from a steering wheel component to the aftermarket component. At step 405, the vehicle configuration is auto-detected at the input side of the SWC interface, and at step 406, the aftermarket component configuration is auto-detected at the output side of the SWC interface. Detection at step 405 can include auto-detection of a variable resistance network of steering wheel components or auto-detection of a vehicle data bus, as previously described. Detection at step 406 can include auto-detection at an input port of the aftermarket component. As discussed below in connection with FIGS. 5 and 6, if an auto-detecting step is unable to sufficiently identify a configuration of the vehicle or the aftermarket component, the SWC interface can prompt a user to configure the SWC interface manually. Based on the auto-detection at steps 405 and 406 (and any corresponding manual configuration), at step 407 the SWC interface can internally configure itself to transmit SWC signals to the aftermarket component. The method terminates at step 408.

Figure 5:
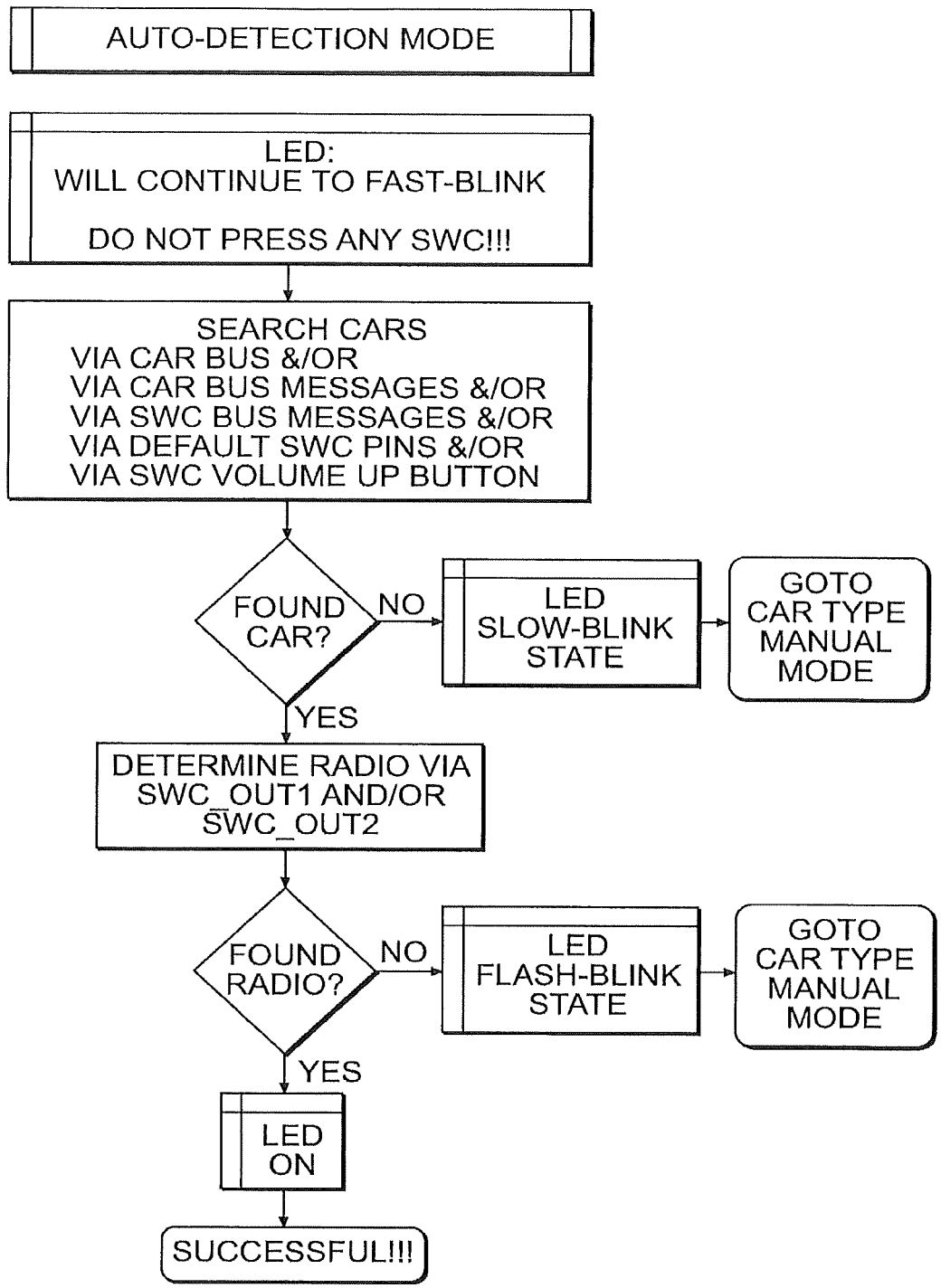
FIG. 5 shows a method of auto-detecting a vehicle configuration and an aftermarket component according to an embodiment of the invention.

A set of steps that may comprise steps 405 and 406 is shown in FIG. 5. As shown in this figure, an LED or other indicator on the SWC interface can inform a user that auto-detection is in process. When auto-detecting the vehicle configuration, as would be the case in step 405, the SWC interface can search for pertinent data or electrical information via several ways, including the vehicle bus and steering wheel components. If the vehicle is sufficiently identified by that data or information, the SWC interface can proceed to auto-detect the aftermarket component configuration. However, if the vehicle configuration cannot be sufficiently identified, a user can be prompted to manually configure the SWC interface with the vehicle information, as discussed below in connection with FIG. 6A. After the SWC interface has determined the vehicle configuration (whether by auto-detection or manual entry), the interface can auto-detect the aftermarket component configuration according to step 406. If the aftermarket component configuration cannot be sufficiently identified by auto-detection, a user can be prompted to manually configure the SWC interface with the aftermarket configuration, as discussed below in connection with FIG. 6B. After the SWC interface has determined the aftermarket configuration (whether by auto-detection or by manual entry), the SWC interface can proceed to indicate that detection is successful (and, in the method of FIG. 4, proceed to step 407).

Figure 6A:
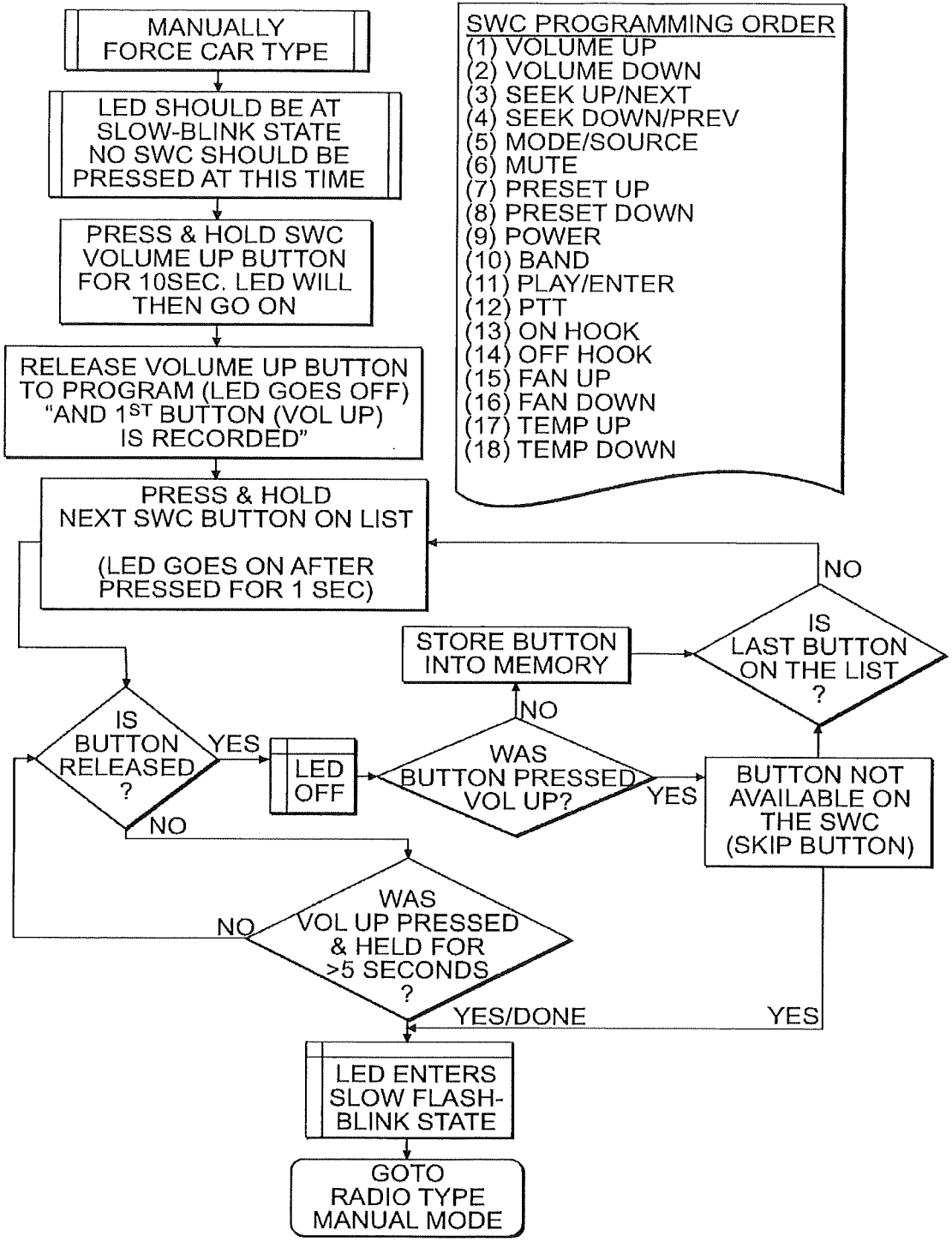
FIG. 6A shows a method of manually configuring an SWC interface.
Figure 6B:
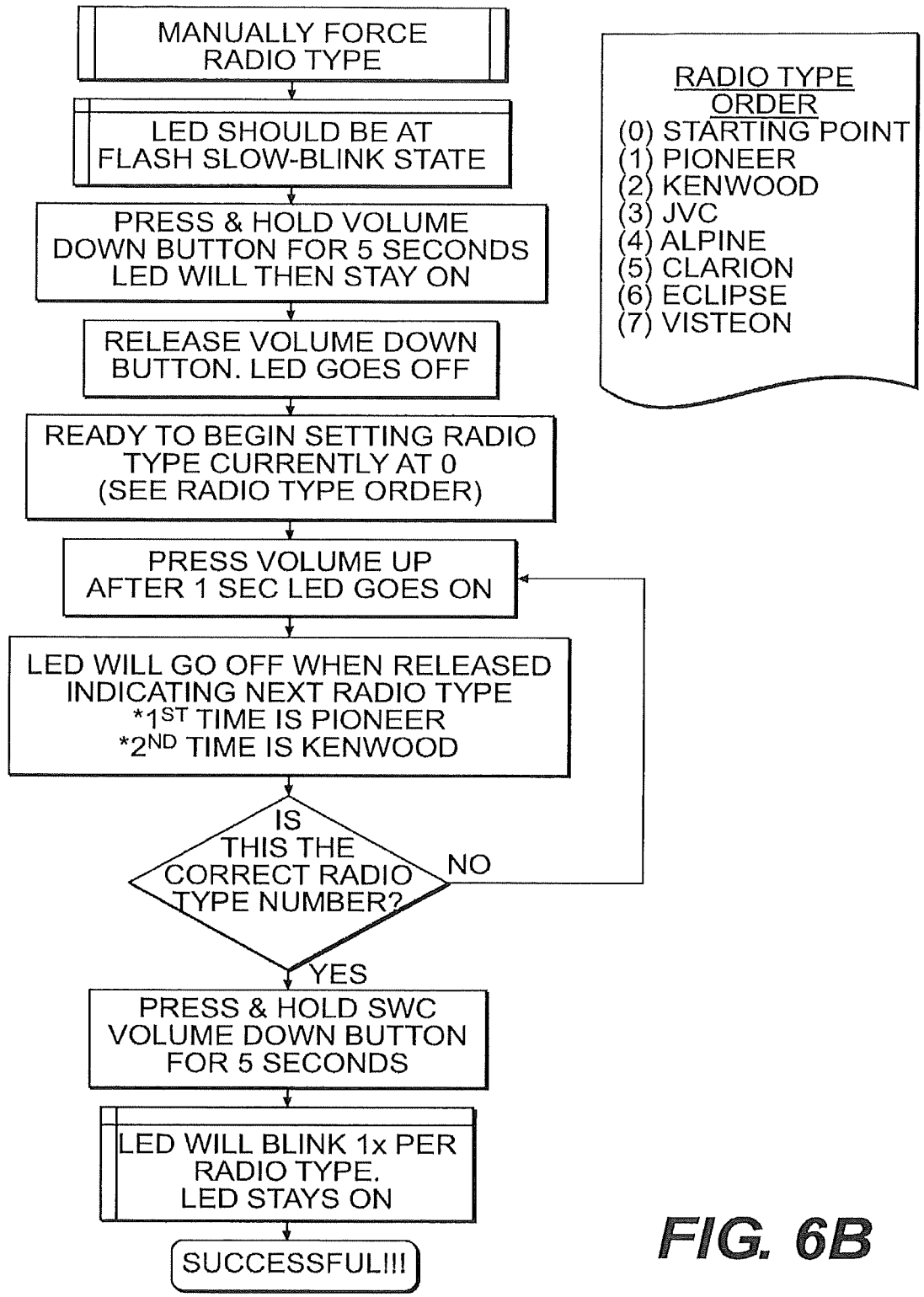
FIG. 6B shows another method of manually configuring an SWC interface.

FIGS. 6A and 6B show example methods for manually configuring an SWC interface with a vehicle configuration and an aftermarket component configuration, respectively. As shown in these figures, manual configuration can be accomplished through operation of steering wheel control components. Such operation can both program the SWC interface to recognize SWC signals and be used for entry of information. During manual configuration, the SWC interface can provide feedback to the user by, for example, visual indicators such as LEDs.

An SWC interface can be manually configured in ways other than those shown in FIGS. 6A and 6B. In some embodiments of the invention, a manual configuration routine can be used to alter the assignment or function of steering wheel control components. For example, an installer can swap a "seek up" button with a "volume up" button or change a "source" button to a "preset" button. Furthermore, such a reassignment or remapping of functions can be performed by any user of the SWC interface e.g., an installer, a vehicle owner, or a later purchaser of the vehicle anytime after installation and configuration of the SWC interface. Unlike devices similar to those discussed in the Background of the Invention, some embodiments of the invention can be remapped using only SWC signals generated by SWC components. That is, user input from SWC components, e.g., steering wheel buttons, can be sufficient to remap an SWC interface; no physical interaction with the installed SWC interface may be required.

The inventive interface includes a memory that is used to store information regarding the potential formats of the vehicle's digital data bus and the potential formats used by the aftermarket stereo ("aftermarket stereo command format"). This aftermarket stereo command format will generally be the format used by the remote control supplied with the aftermarket stereo, though this is not necessarily always the case.

Once the interface module has determined the radio type it is sending commands to, it is possible for the module to store, retrieve, and apply certain user pre-selects. It is important for the reader to recall that the aftermarket radios are most often commanded using commands originally intended to be issued by a remote control. Remote control commands are often transmitted in the format of a desired change rather than an absolute. As an example, consider the volume setting. A particular radio might have 56 discrete volume steps. However, the remote control input is not configured to receive a particular step. Rather, it is configured to receive a "volume up" or "volume down" command.

If the user presently has the volume set at 20 and wishes to increase the volume to 40, he or she presses the "volume up" key on either the steering wheel controls or the dedicated remote control. The aftermarket radio then increases the volume setting at a programmed rate. The current volume setting is also often displayed as it is changing. The user holds down the "volume up" button until the desired level is reached. The user then releases the "volume up" button and the volume level remains fixed.

The "volume up" signal actually transmitted via the hardwired interface is for many radio types a series of high and low voltage signals (binary 1's and 0's). If the signal is steadily repeated a particular radio will increase the volume at a fixed rate. If, on the other hand, the digital sequence is transmitted, then paused, then transmitted again—a single step in the volume setting results. This approach (pulsed transmissions) can in some radios change the volume setting more rapidly.

The interface module can apply a user selected volume pre-select in several ways. A first way is described as follows:

(1) Upon power-up, transmit a "volume down" signal for a time sufficient to ensure that the aftermarket radio has reached its minimum volume setting (typically "mute");

(2) Thereafter transmit a "volume up" signal for a time interval sufficient to place the aftermarket radio at the user's desired volume level.

For an aftermarket radio that can more rapidly change a setting upon receiving a pulsed command, the interface module can transmit a specific number of pulses. If, for example, the desired level is "20" then 20 pulses can be transmitted.

The interface module will have to be able to accommodate a variety of aftermarket radios and a setting that works for one radio will be unlikely to work for another. As an example, some radios receive remote control commands via a particular applied resistance. For such a radio the interface module could apply a volume down level for an extended period, then a 1 k ohm volume up command for 0.9 seconds in order to create the desired "pre-select" volume level. The communication protocol for each radio type will be stored in the interface module. Once the type of aftermarket radio is determined by auto-detection, the appropriate protocol will be retrieved and used.

Many other user pre-selects are possible beyond the initial volume setting. Examples include:
1. Frequency equalizer settings;
2. Left/right gain adjustments;
3. Fader gain adjustments; and
4. "Favorite" channels listed on quick-select buttons.

Although the preceding descriptions contain significant detail, they should not be construed as limiting the scope of the invention but rather as providing illustrations of the preferred embodiments of the invention. Those skilled in the art will know that many other variations are possible without departing from the scope of the invention. Accordingly, the scope of the invention should properly be determined with respect to the claims that are ultimately drafted rather than the examples given.

Having described our invention, we claim:

1. A method of applying a user pre-select to an aftermarket stereo installed in a vehicle having a digital data bus and a digital data bus communication protocol, comprising:
    (a) providing an aftermarket stereo interface including a memory;
    (b) electrically connecting an input side of said aftermarket stereo interface to said digital data bus of said vehicle;
    (c) electrically connecting an output side of said aftermarket stereo interface to said aftermarket stereo;
    (d) said aftermarket stereo interface automatically detecting said data bus communication protocol of said digital data bus;
    (e) said aftermarket stereo interface automatically detecting a type of said aftermarket stereo;
    (f) said aftermarket stereo interface retrieving from memory an aftermarket stereo command format based on said type of said aftermarket stereo;
    (g) said aftermarket stereo interface retrieving said user pre-select from said memory; and
    (h) said aftermarket stereo interface transmitting a command in said aftermarket stereo command format to said aftermarket stereo, said command being based on said user pre-select.

2. The method of applying said user pre-select to said aftermarket stereo as recited in claim 1, wherein said pre-select is a desired volume level for said aftermarket stereo.

3. The method of applying said user pre-select to said aftermarket stereo as recited in claim 2, comprising:
    (a) said aftermarket stereo interface transmitting a "volume down" command to said aftermarket stereo for a first defined interval; and
    (b) said aftermarket stereo interface transmitting a "volume up" command to said aftermarket stereo for a second defined interval.

4. The method of applying said user pre-select to said aftermarket stereo as recited in claim 3, comprising:
    (a) said aftermarket stereo interface monitoring said digital data bus for a steering wheel control signal; and
    (b) upon detecting said steering wheel control signal, said aftermarket stereo interface translating said steering wheel control signal into said aftermarket stereo command format and transmitting said translated signal to said aftermarket stereo.

5. The method of applying said user pre-select to said aftermarket stereo as recited in claim 2, comprising:
    (a) said aftermarket stereo interface transmitting a "volume down" command to said aftermarket stereo for a first defined interval; and
    (b) said aftermarket stereo interface transmitting a defined plurality of individual "volume up" commands to said aftermarket stereo.

6. The method of applying said user pre-select to said aftermarket stereo as recited in claim 5, comprising:
    (a) said aftermarket stereo interface monitoring said digital data bus for a steering wheel control signal; and
    (b) upon detecting said steering wheel control signal, said aftermarket stereo interface translating said steering wheel control signal into said aftermarket stereo command format and transmitting said translated signal to said aftermarket stereo.

7. The method of applying said user pre-select to said aftermarket stereo as recited in claim 2, comprising:
    (a) said aftermarket stereo interface monitoring said digital data bus for a steering wheel control signal; and
    (b) upon detecting said steering wheel control signal, said aftermarket stereo interface translating said steering wheel control signal into said aftermarket stereo command format and transmitting said translated signal to said aftermarket stereo.

8. The method of applying said user pre-select to said aftermarket stereo as recited in claim 2, wherein said digital data bus is a CAN bus.

9. The method of applying said user pre-select to said aftermarket stereo as recited in claim 1, comprising:
    (a) said aftermarket stereo interface monitoring said digital data bus for a steering wheel control signal; and
    (b) upon detecting said steering wheel control signal, said aftermarket stereo interface translating said steering wheel control signal into said aftermarket stereo command format and transmitting said translated signal to said aftermarket stereo.

10. The method of applying said user pre-select to said aftermarket stereo as recited in claim 1, wherein said digital data bus is a CAN bus.

11. A method of applying a user pre-select to an aftermarket stereo installed in a vehicle having a digital data bus and a digital data bus communication protocol, comprising:
    (a) providing an aftermarket stereo interface including a processor and an associated memory, said processor running software governing its operation;
    (b) connecting an input side of said aftermarket stereo interface to said digital data bus of said vehicle;
    (c) connecting an output side of said aftermarket stereo interface to said aftermarket stereo;

(d) said aftermarket stereo interface automatically detecting said data bus communication protocol of said digital data bus;

(e) said aftermarket stereo interface automatically detecting a type of said aftermarket stereo;

(f) said aftermarket stereo interface retrieving from memory an aftermarket stereo command format based on said type of said aftermarket stereo;

(g) said aftermarket stereo interface retrieving said user pre-select from said memory; and (h) said aftermarket stereo interface transmitting a command in said aftermarket stereo command format to said aftermarket stereo, said command being based on said user pre-select.

12. The method of applying said user pre-select to said aftermarket stereo as recited in claim 11, wherein said pre-select is a desired volume level for said aftermarket stereo.

13. The method of applying said user pre-select to said aftermarket stereo as recited in claim 12, comprising:

(a) said aftermarket stereo interface transmitting a "volume down" command to said aftermarket stereo for a first defined interval; and (b) said aftermarket stereo interface transmitting a "volume up" command to said aftermarket stereo for a second defined interval.

14. The method of applying said user pre-select to said aftermarket stereo as recited in claim 13, comprising:

(a) said aftermarket stereo interface monitoring said digital data bus for a steering wheel control signal; and (b) upon detecting said steering wheel control signal, said aftermarket stereo interface translating said steering wheel control signal into said aftermarket stereo command format and transmitting said translated signal to said aftermarket stereo.

15. The method of applying said user pre-select to said aftermarket stereo as recited in claim 12, comprising:

(a) said aftermarket stereo interface transmitting a "volume down" command to said aftermarket stereo for a first defined interval; and (b) said aftermarket stereo interface transmitting a defined plurality of individual "volume up" commands to said aftermarket stereo.

16. The method of applying said user pre-select to said aftermarket stereo as recited in claim 15, comprising:

(a) said aftermarket stereo interface monitoring said digital data bus for a steering wheel control signal; and (b) upon detecting said steering wheel control signal, said aftermarket stereo interface translating said steering wheel control signal into said aftermarket stereo command format and transmitting said translated signal to said aftermarket stereo.

17. The method of applying said user pre-select to said aftermarket stereo as recited in claim 12, comprising:

(a) said aftermarket stereo interface monitoring said digital data bus for a steering wheel control signal; and (b) upon detecting said steering wheel control signal, said aftermarket stereo interface translating said steering wheel control signal into said aftermarket stereo command format and transmitting said translated signal to said aftermarket stereo.

18. The method of applying said user pre-select to said aftermarket stereo as recited in claim 12, wherein said digital data bus is a CAN bus.

19. The method of applying said user pre-select to said aftermarket stereo as recited in claim 11, comprising:

(a) said aftermarket stereo interface monitoring said digital data bus for a steering wheel control signal; and (b) upon detecting said steering wheel control signal, said aftermarket stereo interface translating said steering wheel control signal into said aftermarket stereo command format and transmitting said translated signal to said aftermarket stereo.

20. The method of applying said user pre-select to said aftermarket stereo as recited in claim 11, wherein said digital data bus is a CAN bus.

\* \* \* \* \*